(12) United States Patent
Panusopone et al.

(10) Patent No.: US 6,647,061 B1
(45) Date of Patent: Nov. 11, 2003

(54) VIDEO SIZE CONVERSION AND TRANSCODING FROM MPEG-2 TO MPEG-4

(75) Inventors: Krit Panusopone, San Diego, CA (US); Xuemin Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 684 days.

(21) Appl. No.: 09/590,928

(22) Filed: Jun. 9, 2000

(51) Int. Cl.[7] ............................................. H04N 7/12
(52) U.S. Cl. ............................................. 375/240.12
(58) Field of Search .......................... 375/240.01, 240.02, 375/240.03, 240.12, 240.13, 240.16, 240.18, 240.2, 240.21, 240.24, 240.26, 240.29; 382/232, 235, 236, 238, 239, 248, 250, 251; H04N 7/12

(56) References Cited

U.S. PATENT DOCUMENTS

| | | |
|---|---|---|
| 5,477,397 A | 12/1995 | Naimpally et al. |
| 5,617,142 A | 4/1997 | Hamilton |
| 5,619,733 A | 4/1997 | Noe et al. |
| 5,923,814 A | 7/1999 | Boyce |
| 5,926,573 A | 7/1999 | Kim et al. |
| 5,933,500 A | 8/1999 | Blatter et al. |

FOREIGN PATENT DOCUMENTS

| | | |
|---|---|---|
| EP | 627 854 | 12/1994 |
| EP | 0 794 674 | 9/1997 |
| EP | 1 032 214 | 8/2000 |
| WO | 97/39584 | 10/1997 |

OTHER PUBLICATIONS

R. Dugad and N. Ahuja, "A Fast Scheme for Downsampling and Upsampling in the DCT Domain," ICIP99.
C. Yim and M. A. Isnardi, "An Efficient Method for DCT–Domain Image Resizing with Mixed Field/Frame–Mode Macroblocks," IEEE Trans. Circ. and Syst. for Video Technology, vol. 9, pp. 696–700, Aug. 1999.
G. Keesman, et al., "Transcoding of MPEG bitstreams," Signal Processing: IMAGE Communication, vol. 8, pp. 481–500, 1996.
Boyce, J.M., "Data Selection Strategies for Digital VCR Long Play Mode," *Digest of Technical Papers for the International Conference on Consumer Electronics*, New York, Jun. 21, 1994, pp. 32–33.

(List continued on next page.)

*Primary Examiner*—Young Lee
(74) *Attorney, Agent, or Firm*—Barry R. Lipsitz; Douglas M. McAllister

(57) ABSTRACT

A transcoder architecture that provides the lowest possible complexity with a small error, e.g., for converting an MPEG-2 bitstream into an MPEG-4 bitstream. The transcoder reads header information from an input bitstream and provides a corresponding header in the new format for the output bitstream. In one embodiment, a low complexity front-to-back transcoder (with B frames disabled) avoids the need for motion compensation processing. In another embodiment, a transcoder architecture that minimizes drift error (with B frames enabled) is provided. In another embodiment, a size transcoder (with B frames enabled) is provided, e.g., to convert a bitstream of ITU-R 601 interlaced video coding with MPEG-2 MP@ML into a simple profile MPEG-4 bitstream which contains SIF progressive video suitable for a streaming video application. For spatial downscaling of field-mode DCT blocks, vertical and horizontal downscaling techniques are combined to use sparse matrixes to reduce computations.

14 Claims, 8 Drawing Sheets

OTHER PUBLICATIONS

Björk, Niklas et al., "Transcoder Architectures for Video Coding," IEEE Transactions on Consumer Electronics, vol. 44, No. 1, Feb. 1998, pp. 88–98.

Staff of Cable Television Laboratories Inc., "Digital TV Solutions," From the Labs: Cable World, Feb. 1, 1999.

Gebeloff,Rob., "The Missing Link," http://www.talks.com/interactive/misslink–x.html.

*Patent Abstracts of Japan,* Abstract of Japanese Patent "Image Information Converter and Method", Publication No. 20001204026, Jul. 27, 2001.

Dogan, S., et al., "Efficient MPEG–4/H/263 Video Transcoder for Interoperability of Heterogeneous Multimedia Networks", *Electronics Letters*, vol. 35, No. 11, May 27, 1999.

Wee, S.J., et al., "Field–to–Frame Transcoding with Spatial and Temporal Downsampling", IEEE, vol. 4 of 4, Oct. 24, 1999, pp. 271–275.

Wee, S.J., et al., "Efficient Processing of Compressed Video", IEEE, vol. 1, 1998, pp. 855–859.

Morrison, D.G., et al., "Reduction of Bit–Rate of Compressed Video While in its Coded Form", International Workshop on Packet Video, Sep. 1, 1994, pp. D17.1–D17.4.

Song, J., et al., "Fast Extraction of Spatially Reduced Image Sequences from MPEG–2 Compressed Video", *IEEE Transactions on Circuits and Systems for Video Technology,* IEEE Inc., New York, vol. 9, No. 7, Oct. 1999.

Shen, B., et al., "Adaptive Motion–Vector Resampling for Compressed Video Downscaling", *IEEE Transactions on Circuits and Systems for Video Technology*, IEEE Inc., New York, vol. 9, No. 6, Sep. 1999.

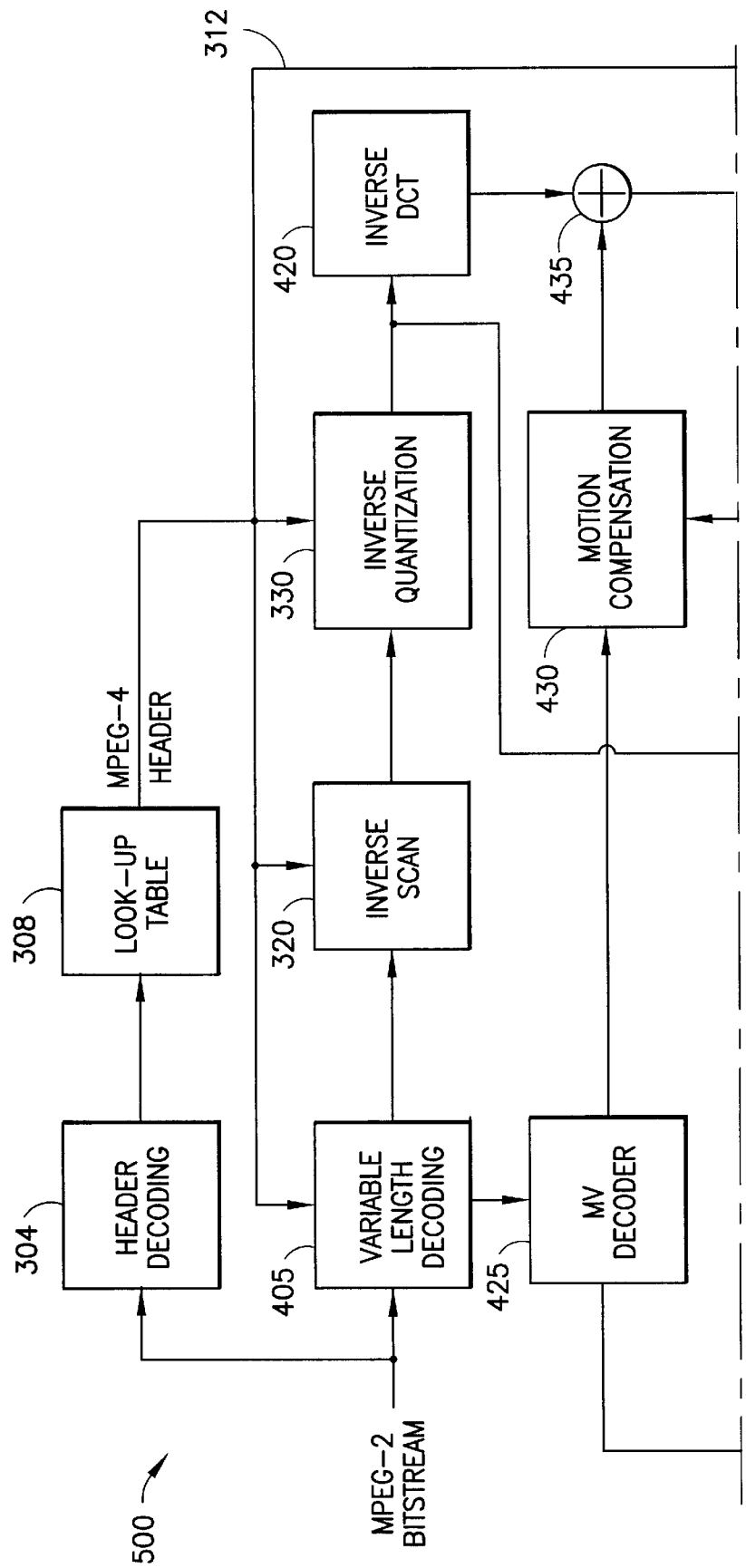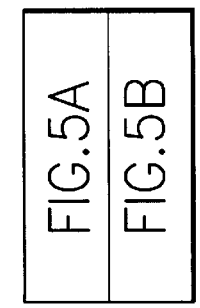
FIG.5A
FIG.5
| FIG.5A |
| FIG.5B |

VIDEO SIZE CONVERSION AND TRANSCODING FROM MPEG-2 TO MPEG-4

BACKGROUND OF THE INVENTION

The present invention relates to compression of multimedia data and, in particular, to a video transcoder that allows a generic MPEG-4 decoder to decode MPEG-2 bitstreams. Temporal and spatial size conversion (downscaling) are also provided.

The following acronyms and terms are used:
CBP—Coded Block Pattern
DCT—Discrete Cosine Transform
DTV—Digital Television
DVD—Digital Video Disc
HDTV—High Definition Television
FLC—Fixed Length Coding
IP—Internet Protocol
MB—Macroblock
ME—Motion Estimation
ML—Main Level
MP—Main Profile
MPS—MPEG-2 Program Stream
MTS—MPEG-2 Transport Stream
MV—Motion Vector
QP—quantization parameter
PMV—Prediction Motion Vector
RTP—Real-Time Transport Protocol (RFC 1889)
SDTV—Standard Definition Television
SIF—Standard Intermediate Format
SVCD—Super Video Compact Disc
VLC—Variable Length Coding
VLD—Variable Length Decoding
VOP—Video Object Plane MPEG-4, the multimedia coding standard, provides a rich functionality to support various applications, including Internet applications such as streaming media, advertising, interactive gaming, virtual traveling, etc. Streaming video over the Internet (multicast), which is expected to be among the most popular application for the Internet, is also well-suited for use with the MPEG-4 visual standard (ISO/IEC 14496-2 Final Draft of International Standard (MPEG-4), "Information Technology—Generic coding of audio-visual objects, Part 2: visual," December 1998).

MPEG-4 visual handles both synthetic and natural video, and accommodates several visual object types, such as video, face, and mesh objects. MPEG-4 visual also allows coding of an arbitrarily shaped object so that multiple objects can be shown or manipulated in a scene as desired by a user. Moreover, MPEG-4 visual is very flexible in terms of coding and display configurations by including enhanced features such as multiple auxiliary (alpha) planes, variable frame rate, and geometrical transformations (sprites).

However, the majority of the video material (e.g., movies, sporting vents, concerts, and the like) which is expected to be the target of streaming video is already compressed by the MPEG-2 system and stored on storage media such as DVDs, computer memories (e.g., server hard disks), and the like. The MPEG-2 System specification (ISO/IEC 13818-2 International Standard (MPEG-2), "Information Technology— Generic coding of Moving Pictures and Associated Audio: Part 2—Video," 1995) defines two system stream formats: the MPEG-2 Transport Stream (MTS) and the MPEG-2 Program Stream (MPS). The MTS is tailored for communicating or storing one or more programs of MPEG-2 compressed data and also other data in relatively error-prone environments. One typical application of MTS is DTV. The MPS is tailored for relatively error-free environments. The popular applications include DVD and SVCD.

Attempts to address this issue have been unsatisfactory to date. For example, the MPEG-4 studio profile (O. Sunohara and Y. Yagasaki, "The draft of MPEG-4 Studio Profile Amendment Working Draft 2.0," ISO/IEC JTC1/SC29/WG11 MPEG99/5135, October 1999) has proposed a MPEG-2 to MPEG-4 transcoder, but that process is not applicable to the other MPEG-4 version 1 profiles, which include the Natural Visual profiles (Simple, Simple Scaleable, Core, Main, N-Bit), Synthetic Visual profiles (Scaleable Texture, Simple Face Animation), and Synthetic/Natural Hybrid Visual (Hybrid, Basic Animated Texture). The studio profile is not applicable to the Main Profile of MPEG-4 version 1 since it modifies the syntax, and the decoder process is incompatible with the rest of the MPEG-4 version 1 profiles.

The MPEG standards designate several sets of constrained parameters using a two-dimensional ranking order. One of the dimensions, called the "profile" series, specifies the coding features supported. The other dimension, called "level", specifies the picture resolutions, bit rates, and so forth, that can be accommodated.

For MPEG-2, the Main Profile at Main Level, or MP@ML, supports a 4:2:0 color subsampling ratio, and I, P and B pictures. The Simple Profile is similar to the Main Profile but has no B-pictures. The Main Level is defined for ITU-R 601 video, while the Simple Level is defined for SIF video.

Similarly, for MPEG-4, the Simple Profile contains SIF progressive video (and has no B-VOPs or interlaced video). The Main Profile allows B-VOPs and interlaced video.

Accordingly, it would be desirable to achieve interoperability among different types of end-systems by the use of MPEG-2 video to MPEG-4 video transcoding and/or MPEG-4-video to MPEG-2-video transcoding. The different types of end-systems that should be accommodated include:

Transmitting Interworking Unit (TIU): Receives MPEG-2 video from a native MTS (or MPS) system and transcodes to MPEG-4 video and distributes over packet networks using a native RTP-based system layer (such as an IP-based internetwork). Examples include a real-time encoder, a MTS satellite link to Internet, and a video server with MPS-encoded source material.

Receiving Interworking Unit (RIU): Receives MPEG-4 video in real time from an RTP-based network and then transcodes to MPEG-2 video (if possible) and forwards to a native MTS (or MPS) environment. Examples include an Internet-based video server to MTS-based cable distribution plant.

Transmitting Internet End-System (TIES): Transmits MPEG-2 or MPEG-4 video generated or stored within the Internet end-system itself, or received from internet-based computer networks. Examples include a video server.

Receiving Internet End-System (RIES): Receives MPEG-2 or MPEG-4 video over an RTP-based internet for consumption at the Internet end-system or forwarding to a traditional computer network. Examples include a desktop PC or workstation viewing a training video.

It would be desirable to determine similarities and differences between MPEG-2 and MPEG-4 systems, and provide transcoder architectures which yield a low complexity and small error.

The transcoder architectures should be provided for systems where B-frames are enabled (e.g., main profile), as well as a simplified architecture for when B-frames are not used (simple profile).

Format (MPEG-2 to MPEG-4) and/or size transcoding should be provided.

It would also be desirable to provide an efficient mapping from the MPEG-2 to MPEG-4 syntax, including a mapping of headers.

The system should include size transcoding, including spatial and temporal transcoding.

The system should allow size conversion at the input bitstream or output bitstream of a transcoder.

The size transcoder should convert a bitstream of ITU-R 601 interlaced video coded with MPEG-2 MP@ML into a simple profile MPEG-4 bitstream which contains SIF progressive video suitable, e.g., for a streaming video application.

The system should provide an output bitstream that can fit in the practical bandwidth for a streaming video application (e.g., less than 1 Mbps).

The present invention provides a system having the above and other advantages.

SUMMARY OF THE INVENTION

The invention relates to format transcoding (MPEG-2 to MPEG-4) and size (spatial and temporal) transcoding.

A proposed transcoder includes size conversion, although these parameters can be transcoded either at the input bitstream or the output bitstream. However, it is more efficient to include all kinds of transcoding into the product version of a transcoder to reduce the complexity since the transcoders share processing elements with each other (such as a bitstream reader).

The invention addresses the most important requirements for a transcoder, e.g., the complexity of the system and the loss generated by the process.

In one embodiment, a proposed front-to-back transcoder architecture reduces complexity because there is no need to perform motion compensation.

In a particular embodiment, the transcoder can use variable 5-bit QP representation, and eliminates AC/DC prediction and the nonlinear DC scaler.

The invention is alternatively useful for rate control and resizing.

A particular method for transcoding a pre-compressed input bitstream that is provided in a first video coding format includes the steps of: recovering header information of the input bitstream; providing corresponding header information in a second, different video coding format; partially decompressing the input bitstream to provide partially decompressed data; and re-compressing the partially decompressed data in accordance with the header information in the second format to provide the output bitstream.

A method for performing 2:1 downscaling on video data includes the steps of: forming at least one input matrix of N×N (e.g., N=16) Discrete Cosine Transform (DCT) coefficients from the video data by combining four N/2×N/2 field-mode DCT blocks; performing vertical downsampling and de-interlacing to the input matrix to obtain two N/2×N/2 frame-mode DCT blocks; forming an N×N/2 input matrix from the two frame-mode DCT blocks; and performing horizontal downsampling to the N×N/2 matrix to obtain one N/2×N/2 frame-mode DCT block.

Preferably, the vertical and horizontal downsampling use respective sparse downsampling matrixes. In particular, a vertical downsampling matrix of $0.5[I_8 \ I_8]$ may be used, where $I_8$ is an 8×8 identity matrix. This is essentially vertical pixel averaging. A horizontal downsampling matrix composed of odd "O" and even "E" matrices may be used.

Corresponding apparatuses are also presented.

DETAILED DESCRIPTION OF THE INVENTION

The invention relates to format transcoding (MPEG-2 to MPEG-4) and size (spatial and temporal) transcoding.

The invention provides bit rate transcoding to convert a pre-compressed bitstream into another compressed bitstream at a different bit rate. Bit rate transcoding is important, e.g., for streaming video applications because the network bandwidth is not constant and, sometimes, a video server needs to reduce the bit rate to cope with the network traffic demand. A cascaded-based transcoder which re-uses MVs from the input bitstream and, hence, eliminates motion estimation (ME), is among the most efficient of the bit rate transcoders. The cascaded-based transcoder decodes the input bitstream to obtain the MV and form the reference frame. It then encodes this information with a rate control mechanism to generate an output bitstream at the desired bit rate.

Spatial resolution transcoding becomes a big issue with the co-existence of HDTV and SDTV in the near future. It is also very beneficial for the streaming video application since it is likely that the Internet bandwidth is not going to be large enough for broadcast quality video. Hence, downsampling of the broadcast quality bitstream into a bitstream with a manageable resolution is appealing. Spatial resolution transcoding usually performs in the compressed (DCT) domain since it drastically reduces the complexity of the system. The process of downsampling in the compressed domain involves the processing of two parameters, namely DCT coefficients and MVs. A downsampling filter and its fast algorithm is suggested to perform DCT coefficient downsampling. MV resampling is used to find the MV of the downsampled video. In the real product, to avoid drift, the residual of the motion compensation should be re-transformed instead of approximating the DCT coefficients from the input bitstream.

2. High Level Comparison

Structure-wise, MPEG-2 and MPEG-4 employ a similar video compression algorithm. Fundamentally, both standards adopt motion prediction to exploit temporal correlation and quantization in the DCT domain to use spatial correlation within a frame. This section describes the structure of the MPEG-2 and MPEG-4 decoders at a high level, and then notes differences between the two standards.

2.1 MPEG-2

Figure 1:
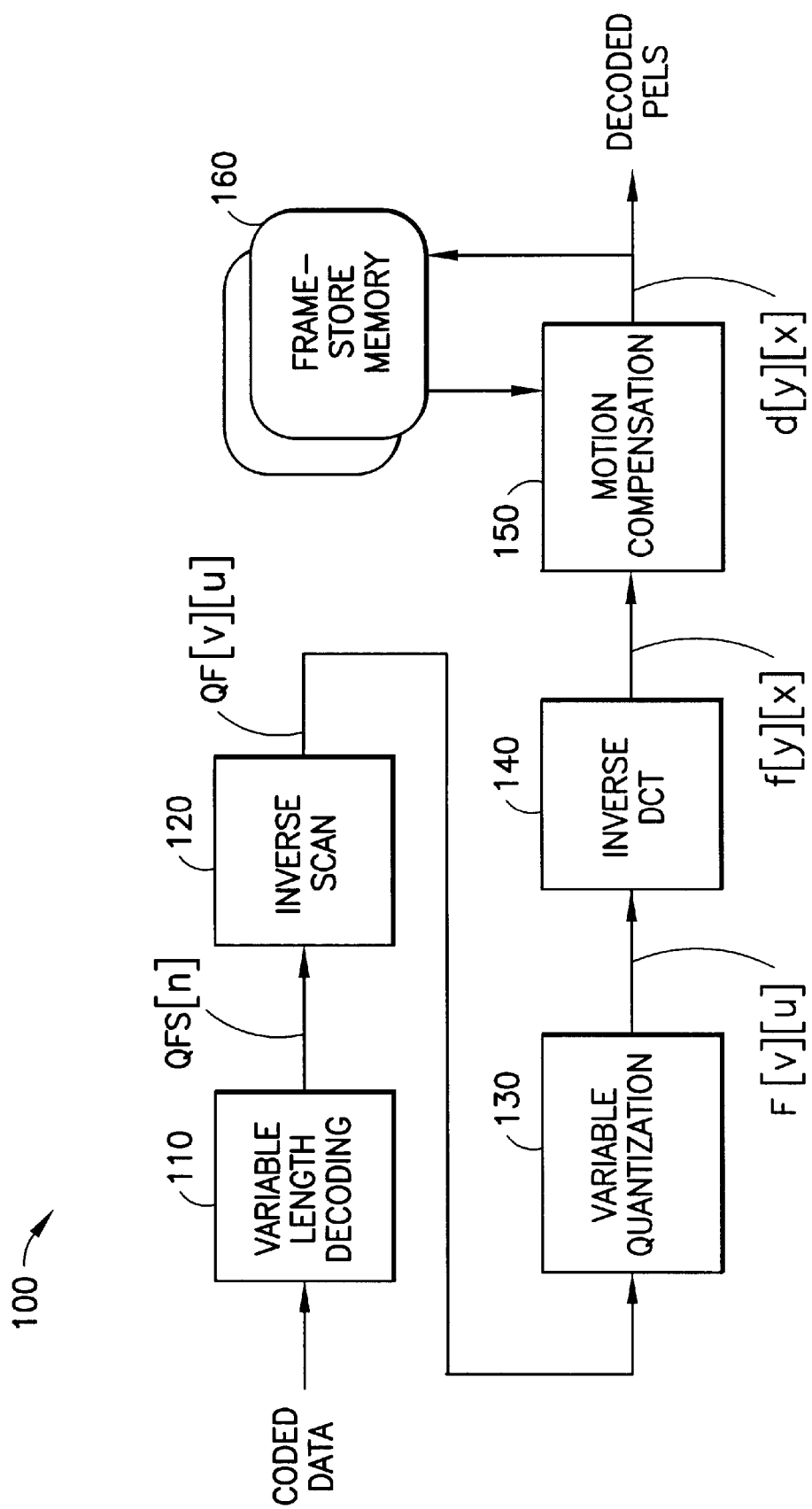
FIG. 1 illustrates an MPEG-2 video decoder.

FIG. 1 shows the simplified video decoding process of MPEG-2. In the decoder 100, coded video data is provided to a variable length decoding function 110 to provide the one-dimensional data QFS[n], where n is a coefficient index in the range of 0–63. At the inverse scan function 120, QFS[n] is converted into a two-dimensional array of coefficients denoted by QF[v][u], where the array indexes u and v both lie in the range 0 to 7. An inverse quantisation function 130 applies the appropriate inverse quantisation arithmetic to give the final reconstructed, frequency-domain DCT coefficients, F[v][u]. An inverse DCT function 140 produces the pixel (spatial) domain values f[y][x]. A motion compensation function 150 is responsive to a frame store memory 160 and the values f[y][x] for producing the decoded pixels (pels) d[y][x], where y and x are Cartesian coordinates in the pixel domain.

MPEG-2 operates on a macroblock level for motion compensation, a block level for the DCT transformation, and the coefficient level for run-length and lossless coding. Moreover, MPEG-2 allows three types of pictures, namely I-, P- and B- pictures. Allowed motion prediction modes (forward, backward, bi-directional) are specified for the P- and B- pictures. MPEG-2 uses interlaced coding tools to handle interlaced sources more efficiently.

2.2 MPEG-4

Figure 2:
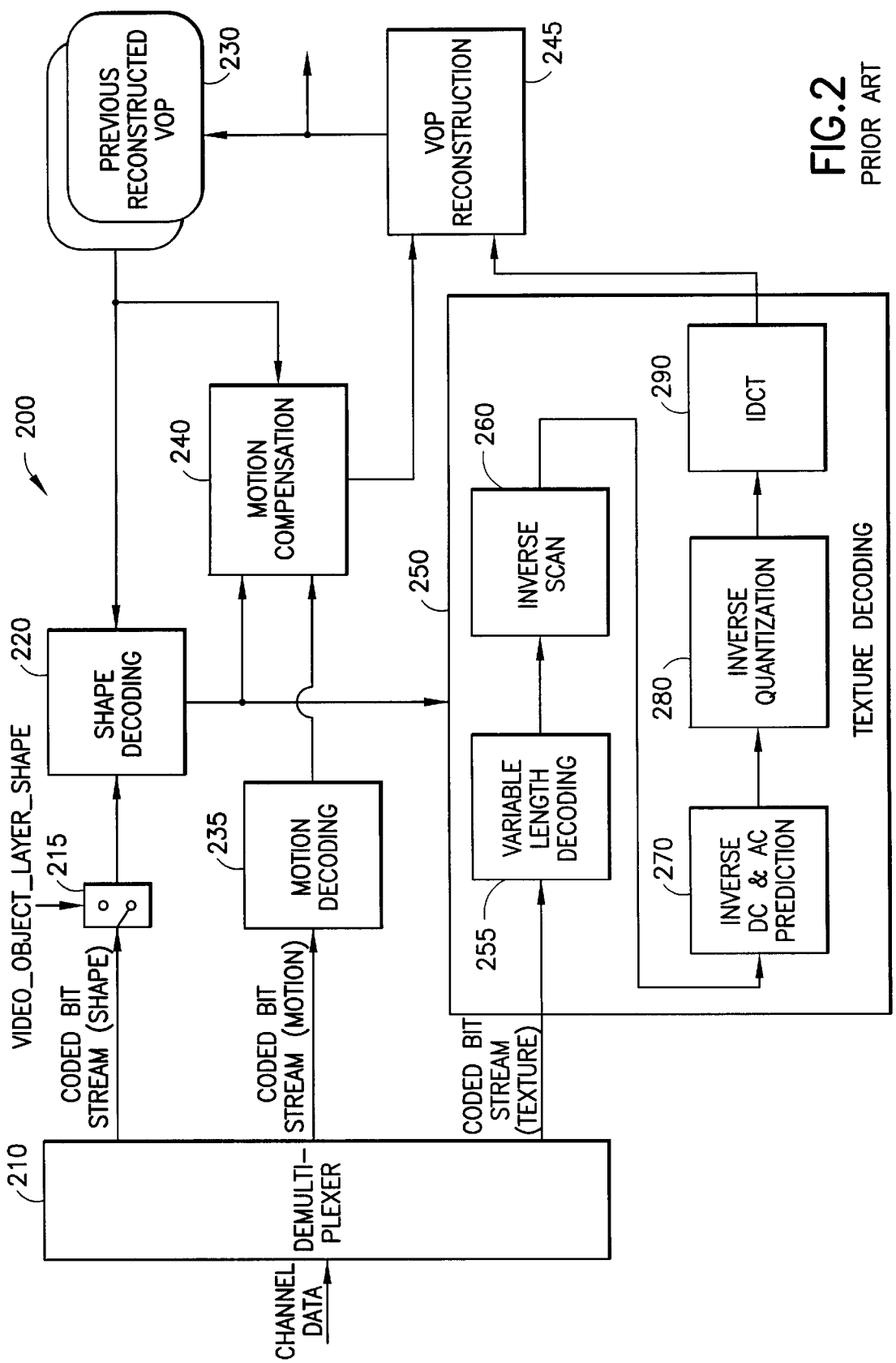
FIG. 2 illustrates an MPEG-4 video decoder without any scalability feature.

FIG. 2 shows the MPEG-4 video decoding process without any scalability features.

At the decoder 200, data from a channel is output from a demux 210. A coded bit stream of shape data is provided to a switch 215, along with the MPEG-4 term video_object_layer_shape (which indicates, e.g., whether or not the current image is rectangular, binary only, or grayscale). If video_object_layer_shape is equal to "00" then no binary shape decoding is required. Otherwise, binary shape decoding is carried out.

If binary shape decoding is performed, a shape decoding function 220 receives the previous reconstructed VOP 230 (which may be stored in a memory), and provides a shape-decoded output to a motion compensation function 240. The motion compensation function 240 receives an output from a motion decoding function 235, which, in turn, receives a motion coded bit stream from the demux 210. The motion compensation function 240 also receives the previous reconstructed VOP 230 to provide an output to a VOP reconstruction function 245.

The VOP reconstruction function 245 also receives data from a texture decoding function 250 which, in turn, receives a texture coded bit stream from the demux 210, in addition to an output from the shape decoding function 220. The texture decoding function 250 includes a variable length decoding function 255, an inverse scan function 260, an inverse DC and AC prediction function 270, an inverse quantization function 280 and an Inverse DCT (IDCT) function 290.

Compared to MPEG-2, several new tools are adopted in MPEG-4 to add features and interactivity, e.g., sprite coding, shape coding, still texture coding, scalability, and error resilience. Moreover, motion compensation and texture coding tools in MPEG-4, which are similar to MPEG-2 video coding, are modified to improve the coding efficiency, e.g., coding tools such as direct mode motion compensation, unrestricted motion compensation, and advanced prediction.

In particular, direct mode motion compensation is used for B-VOPs. Specifically, it uses direct bi-directional motion compensation derived by employing I- or P-VOP macroblock MVs and scaling them to derive forward and backward MVs for macroblocks in B-VOP. Only one delta MV is allowed per macroblock. The actual MV is calculated from the delta vector and the scaled MV from its co-located macroblock.

Unrestricted motion compensation allows one or four MVs per macroblock. The four MV mode is only possible in B-VOPs with the use of direct mode. Note that the MV for a chrominance macroblock is the average of four MVs from its associated luminance macroblock. Furthermore, unrestricted motion compensation allows an MV to point out of the reference frame (the out-of-bound texture is padded from the edge pixel).

Advanced prediction defines the prediction method for MV and DCT coefficients. A MV predictor is set according to the median value of its three neighbors' MVs. Prediction of the intra DCT coefficient follows the intra AC/DC prediction procedure (Graham's rule).

3. Transcoder Architecture

Figure 3:
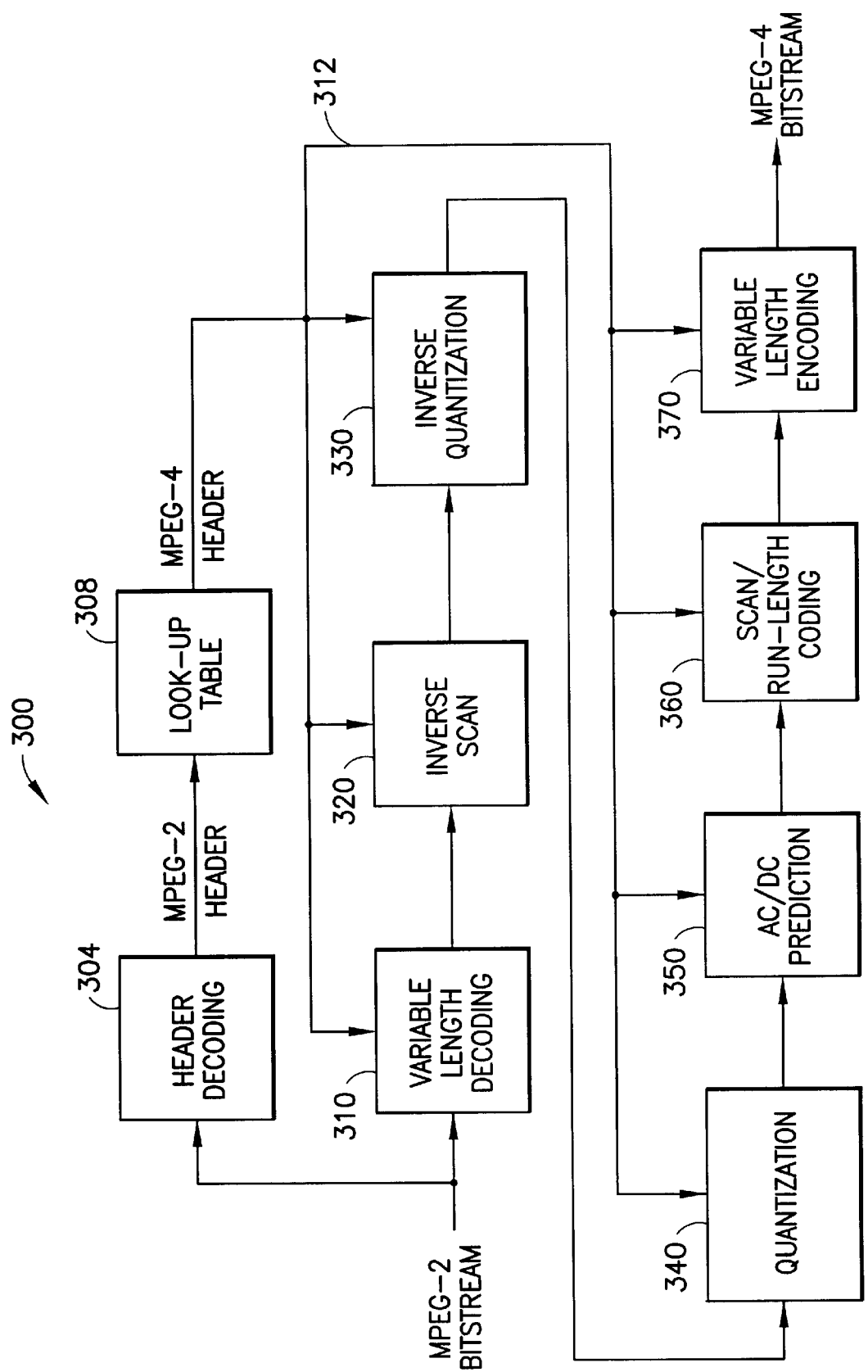
FIG. 3 illustrates a low complexity front-to-back transcoder (with B frames disabled) in accordance with the invention.

FIG. 3 illustrates a low complexity front-to-back transcoder in accordance with the invention, with B frames disabled.

Similarities between the structures of MPEG-2 and MPEG-4 allow a low complexity (front-to-back) transcoder. Instead of completely decoding an MPEG-2 bitstream to the spatial (pixel) domain level, the front-to-back transcoder 300 uses DCT coefficients and MVs to generate an MPEG-4 bitstream without actually performing a motion estimation process. A trade-off is that this architecture may cause a drift in the reconstructed frame, and does not allow bit rate control. However, the drift problem is small since most of the difference between the MPEG-2 and MPEG-4 decoders lies in the lossless coding part.

The transcoder 300 comprises a cascade of a MPEG-2 bitstream reader (decoder) (310–330) and a MPEG-4 header and texture coder (encoder) (340–370), along with a header decoding function 304, a look-up table 308, and a communication path 312. The transcoder 300 reads an input MPEG-2 bitstream, performs a variable length decoding (VLD) at a function 310 on DCT coefficients and MV residual, and then follows MPEG-2 logic to find DCT coefficients and/or MVs of every block in the frame.

The header decoding function 304 decodes the MEPG-2 headers and provides them to a look-up table (or analogous function) 308, which uses the tables detailed below to obtain corresponding MPEG-4 headers.

With the information of the headers, DCT coefficients and/or MV, the transcoder 300 encodes this information into the MPEG-4 format. Note that the reference frame is not needed in this architecture.

The transcoder 300 reads the MPEG-4 header from the input bitstream and writes the corresponding MPEG-4 header in its place in an output bitstream.

After processing at the VLD 310, the data is provided to an inverse scan function 320, and an inverse quantisation function 330. Next, using the MPEG-4 header information provided via the path 312, the decoded, DCT coefficient data is processed at a MPEG-4 header and texture coder that includes a quantisation function 340, and an AC/DC prediction function 350 for differentially encoding the quantised DCT coefficients. In particular, the AC/DC prediction process generates a residual of DC and AC DCT coefficients in an intra MB by subtracting the DC coefficient and either the first row or first column of the AC coefficients. The predictor is adaptively selected. Note that the AC/DC prediction function 350 may not need the MPEG-4 header information.

Subsequently, a scan/run-length coding function 360 and a variable length encoding function 370 provide the MPEG-4 bitstream.

Figure 4A:
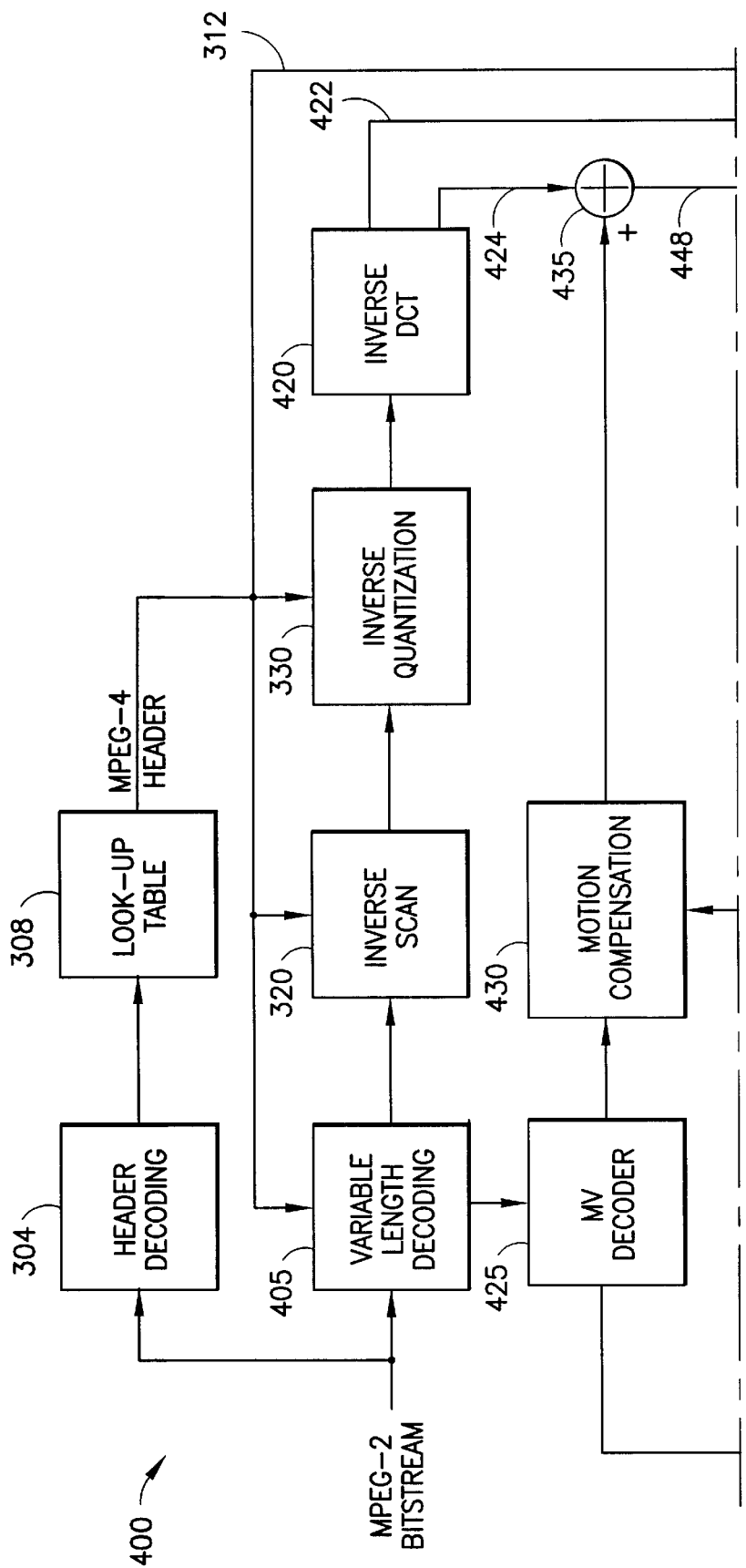
FIG. 4 illustrates a transcoder architecture that minimizes drift error (with B frames enabled) in accordance with the invention.
Figure 4:
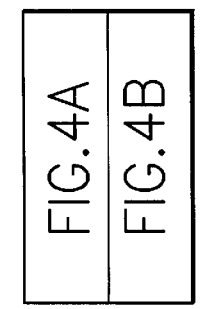
Figure 4B:
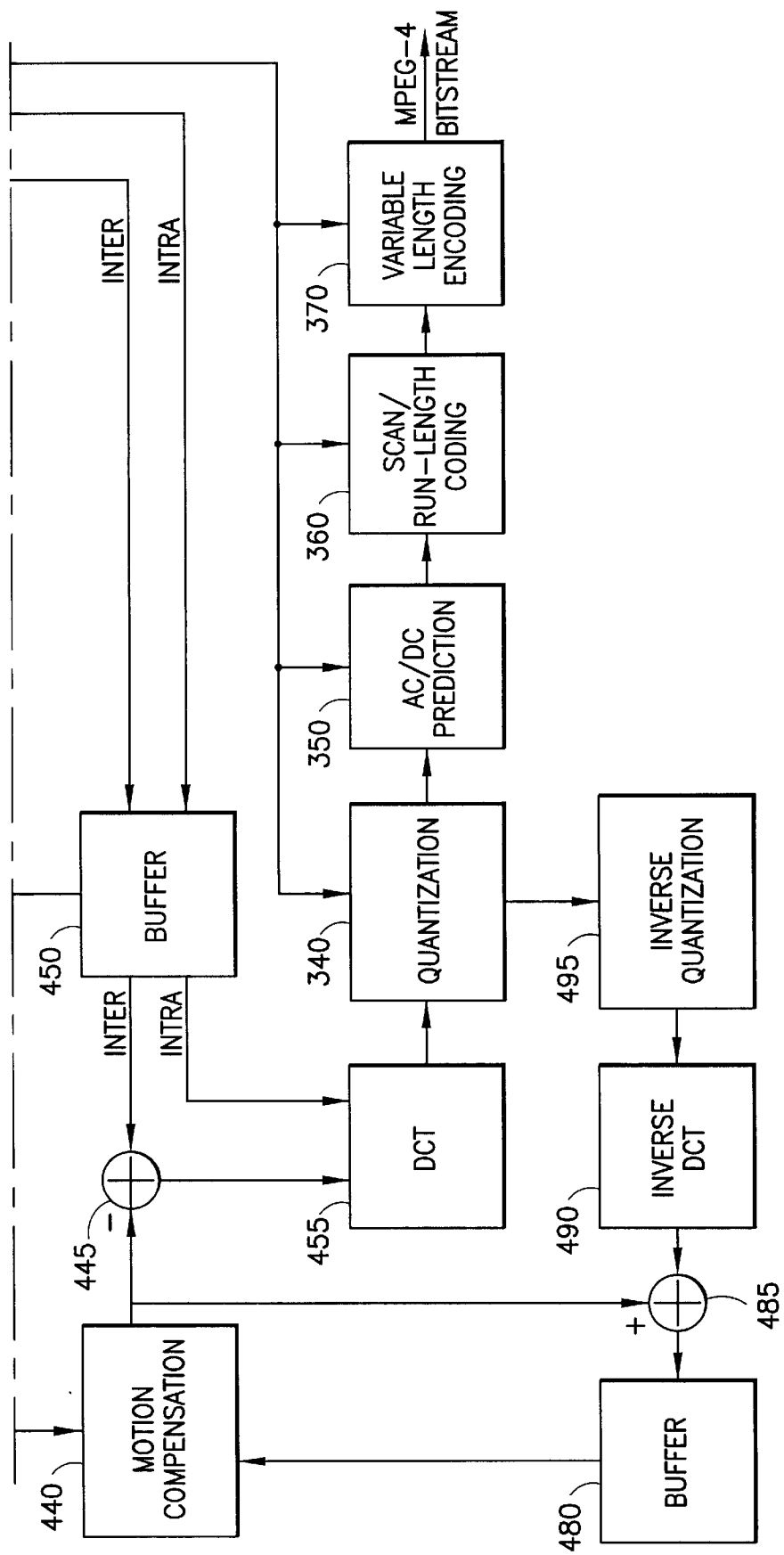

FIG. 4 illustrates a transcoder architecture that minimizes drift error in accordance with the invention, with B frames enabled.

Like-numbered elements correspond to one another in the figures.

To counter the problems of drift in the reconstructed frame, and the lack of bit rate control, a more complex architecture such as the transcoder 400, which is an extension of the transcoder 300 of FIG. 3, can be used. This architecture actually computes the DCT coefficient of the texture/residual data, hence motion compensation is required. Since the encoder of this transcoder includes a decoding process, the drift error can be minimized.

Moreover, the transcoder 400 can be used to transcode bitstreams with B-frames since MPEG-4 does not allow intra mode for B-frames. The transcoder 400 treats a block in intra mode in a B-frame (in MPEG-2) as a block with a zero MV in inter mode (in MPEG-4). It can be either a zero residual MV (PMV) or zero MV (which may yield a non-zero MV code) since the MV is predictive coded against the PMV.

In particular, the transcoder 400 includes a variable length decoding function 405 that provides MV residue data to a MV decoder 425, and that provides DCT coefficient data to the inverse scan function 320. The DCT data is processed by the inverse quantisation function 330 and an inverse DCT function 420 to obtain pixel domain data. Intra-coded pixel data is provided via a path 422 to a buffer, while inter-coded pixel data is provided to an adder 435 via a path 424.

The pixel (difference) data on path 424 is added to reference pixel data from a motion compensation function 430 (responsive to the MV decoder 425) to provide inter-coded data to the buffer 450 via a path 448.

For re-encoding, e.g., in the MPEG-4 format, the buffer 450 either outputs the intra pixel data directly to a DCT function 455, or outputs the inter pixel data to a subtractor 445, where a difference relative to an output from a motion compensation function 440 (responsive to the MV decoder 425) is provided to the DCT function 455.

The DCT coefficients are provided from the DCT function 455 to the quantisation function 340, and the quantised DCT data is then provided to the AC/DC (DCT coefficient) prediction function 350, where AC and DC residuals of the current MB are generated. These residuals of DCT coefficients are entropy coded. The output data is provided to the scan/run-length coding function 360, and the output thereof is provided to the variable length encoding function 370 to obtain the MPEG-4 compliant bitstream.

The quantised DCT coefficients are also output from the quantisation function 340 to an inverse quantisation function 495, the output of which is provided to an inverse DCT function 490, the output of which is summed at an adder 485 with the output of the motion compensation function 440. The output of the adder 485 is provided to a buffer 480, and subsequently to the motion compensation function 440.

The header decoding function 304 and look-up table 308 and path 312 operate as discussed in connection with FIG. 3 to control the re-encoding to the MPEG-4 format at functions 340–370.

4. Implementation of the Format Transcoder

This section explains the implementation of the format transcoding, e.g., as implemented in FIGS. 3 and 4, discussed above, and FIG. 5, to be discussed later. Minor implementation details (e.g., systems-related details such as the use of time stamps and the like) that are not specifically discussed should be apparent to those skilled in the art.

In a particular implementation, the transcoders of the present invention can be used to convert a main-profile, main-level (MP@ML) MPEG-2 bitstream into a main-profile MPEG-4 bitstream. It is assumed that the MPEG-2 bitstream is coded in frame picture structure with B-picture coding (no dual prime prediction). Generally, the same coding mode which is used in MPEG-2 coding should be maintained. This mode is likely to be optimum in MPEG-4 and hence avoids the complexity of the mode decision process. The transparency pattern in MPEG-4 is always 1 (one rectangular object with the same size of VOP in one VOP). That is, MPEG-4 allows an arbitrarily shaped object which is defined by a nonzero transparency pattern. This feature does not exist in MPEG-2 so we can safely assume that all transparency patterns of the transcoding object is one.

4.1 MPEG-2 Bitstream Reader

A transcoder in accordance with the invention obtains the bitstream header, DCT coefficients and MVs from the MPEG-2 bitstream. This information is mixed together in the bitstream. Both MPEG-2 and MPEG-4 bitstreams adopt a hierarchical structure consisting of several layers. Each layer starts with the header following by a multiple of its sublayer. In this implementation, as shown in Table 1, the MPEG-2 layer has a direct translation into the MPEG-4 layer, except the slice layer in MPEG-2, which is not used in MPEG-4. DC coefficients and predicted MVs in MPEG-4 are reset at the blocks that start the slice.

However, some MPEG-4 headers are different from MPEG-2 headers, and vice versa. Fortunately, the restrictions in MPEG-2 and MPEG-2 header information are sufficient to specify a MPEG-4 header. Tables 2 through 6 list MPEG-4 headers and their relation to a MPEG-2 header or restriction at each layer.

TABLE 1

Relationship between MPEG-2 and MPEG-4 layers

| MPEG-2 | MPEG-4 |
|---|---|
| Video Sequence | Video Object Sequence (VOS)/Video Object (VO) |
| Sequence Scalable Extension | Video Object Layer (VOL) |
| Group of Picture (GOP) | Group of Video Object Plane (GOV) |
| Picture | Video Object Plane (VOP) |
| Macroblock | Macroblock |

TABLE 2

MPEG-4 header and its derivation (VOS and VO)

| Header | Code | Comment |
| --- | --- | --- |
| Visual_object_sequence_start_code | 00001B0 | Initiate a visual session |
| Profile_and_level_indication | 00110100 | Main Profile/Level 4 |
| Visual_object_sequence_end_code | 00001B1 | Terminate a visual session |
| Visual_object_start_code | 00001B5 | Initiate a visual object |
| Is_visual_object_identifier | 0 | No version identification of priority needs to be specified |
| Visual_object_type | 0001 | Video ID |
| Video_object_start_code | 0000010X–0000011X | Mark a new video object |
| Video_signal_type | Derived from MPEG-2 | Corresponds to MPEG-2 sequence_display_extension_id |
| Video_format | Same as MPEG-2 | Corresponds to MPEG-2 sequence_display_extension_id |
| Video_range | Derived from MPEG-2 | Corresponds to MPEG-2 sequence_display_extension_id |
| Colour_description | Same as MPEG-2 | Corresponds to MPEG-2 sequence_display_extension_id |
| Colour_primaries | Same as MPEG-2 | Corresponds to MPEG-2 colour_description |
| Transfer_characteristics | Same as MPEG-2 | Corresponds to MPEG-2 colour_description |
| Matrix_coefficients | Same as MPEG-2 | Corresponds to MPEG-2 colour description |

TABLE 3

MPEG-4 header and its derivation (VOL)

| Header | Code | Comment |
| --- | --- | --- |
| Video_object_layer_start_code | 0000012X | Mark a new video object layer |
| Random_accessible_vol | 0 | Allow non-intra coded VOP |
| Video_object_type_identification | 00000100 | Main object type |
| Is_object_type_identifier | 0 | No version identification of priority needs to be specified |
| Aspect_ratio_info | Same as MPEG-2 | Corresponds to MPEG-2 aspect_ratio_information |
| Par_width | Same as MPEG-2 | Corresponds to MPEG-2 vertical_size |
| Par_height | Same as MPEG-2 | Corresponds to MPEG-2 horizontal_size |
| Vol_control_parameters | Same as MPEG-2 | Correponds to MPEG-2 extension_start_code_identifier (sequence extension) |
| Chroma_format | Same as MPEG-2 | Corresponds to MPEG-2 chroma_format |
| Low_delay | Same as MPEG-2 | Corresponds to MPEG-2 low_delay |
| Vbv_parameters | Recomputed | Follow MPEG-4 VBV spec. |
| Video_object_layer_shape | 00 | Rectangular |
| Vop_time_increment_resolution | Recomputed | See Table 7 |
| Fixed_vop_rate | 1 | indicate that all VOPs are coded at a fixed rate |
| Fixed_vop_time_increment | Recomputed | See Table 7 |
| Video_object_layer_width | Same as MPEG-2 | Correpond to display_vertical_size |
| Video_object_layer_height | Same as MPEG-2 | Correspond to display_horizontal_size |
| Interlaced | Same as MPEG-2 | Correspond to progressive_sequence |
| Obmc_disable | 1 | Disable OBMC |
| Sprite_enable | 0 | Indicate absence of sprite |
| Not_8_bit | Derived from MPEG-2 | Corresponds to MPEG-2 intra_dc_precision |
| Quant_type | 1 | MPEG quantization |
| Complexity_estimation_disable | 1 | Disable complexity estimation header |
| Resync_marker_disable | 1 | Indicate absence of resync_marker |
| Data_partitioned | 0 | Disable data partitioning |
| Reversible_vlc | 0 | Disable reversible vlc |
| Scalability | 0 | Indicate that the current layer is used as base-layer |

TABLE 4

MPEG-4 header and its derivation (VOP)

| Header | Code | Comment |
| --- | --- | --- |
| Vop_start_code | 000001B6 | Mark a start of a video object plane |
| Vop_coding_type | Same as MPEG-2 | Corresponds to MPEG-2 picture_coding_type |
| Modulo_time_base | Regenerated | Follow MPEG-4 spec. |
| Vop_time_increment | Regenerated | Follow MPEG-4 spec. |
| Vop_coded | 1 | Indicate that subsequent data exists for the VOP |
| Vop_rounding_type | 0 | Set value of rounding_control to '0' |
| Change_conversion_ratio_disable | 1 | Assume that conv_ratio is '1' for all macroblocks |
| Vop_constant_alpha | 0 | Not include vop_constant_alpha_value in the bitstream |
| Intra_dc_vlc_thr | 0 | Use intra DC vlc for entire VOP |
| Top_field_first | Same as MPEG-2 | Corresponds to MPEG-2 top_field_first |
| Alternate_vertical_scan_flag | Same as MPEG-2 | Corresponds to MPEG-2 to alternate_scan |
| Vop_quant | Derived from MPEG-2 | Corresponds to MPEG-2 quantiser_scale_code |
| Vop_fcode_forward | Same as MPEG-2 | See section 4.3 |
| Vop_fcode_backward | Same as MPEG-2 | See section 4.3 |

TABLE 5

MPEG-4 header and its derivation (macroblock and MV)

| Header | Code | Comment |
| --- | --- | --- |
| Not_coded | Derived from MPEG-2 | Corresponds to MPEG-2 macroblock_address_increment |
| Mcbpc | Derived from MPEG-2 | Corresponds to MPEG-2 macroblock_type |
| Ac_pred_flag | 0 | Disable intra AC prediction |
| Cbpy | Derived from MPEG-2 | See section 4.2 |
| Dquant | Derived from MPEG-2 | See section 4.2 |
| Modb | Derived from MPEG-2 | Corresponds to macroblock_type |
| Mb_type | Derived from MPEG-2 | Corresponds to macroblock_type |
| Cbpb | Derived from MPEG-2 | See section 4.2 |
| Dbquant | Derived from MPEG-2 | See section 4.2 |
| Horizontal_mv_data | Derived from MPEG-2 | Corresponds to MPEG-2 motion_code[r][s][0] |
| Vertical_mv_data | Derived from MPEG-2 | Corresponds to MPEG-2 motion_code[r][s][1] |
| Horizontal_mv_residual | Derived from MPEG-2 | Corresponds to MPEG-2 motion_residual[r][s][0] |
| Vertical_mv_residual | Derived from MPEG-2 | Corresponds to MPEG-2 motion_residual[r][s][1] |

TABLE 6

MPEG-4 header and its derivation (block and interlaced information)

| Header | Code | Comment |
| --- | --- | --- |
| Dct_dc_size_luminance | Same as MPEG-2 | Corresponds to MPEG-2 dct_dc_size_luminance |
| Dct_dc_differential | Same as MPEG-2 | Correspond to dct_dc_differential |
| Dct_dc_size_chrominance | Same as MPEG-2 | Corresponds to MPEG-2 dct_dc_size_chrominance |
| DCT_coefficient | Derived from MPEG-2 | See section 4.2 |
| DCT_type | Same as MPEG-2 | Corresponds to MPEG-2 DCT_type |
| Field_prediction | Same as MPEG-2 | Corresponds to MPEG-2 frame_motion_type |
| Forward_top_field_reference | Same as MPEG-2 | Corresponds to MPEG-2 motion_vertical_field_select[0][0] |
| Forward_bottom_field_reference | Same as MPEG-2 | Corresponds to MPEG-2 motion_vertical_field_select[1][0] |
| Backward_top_field_reference | Same as MPEG-2 | Corresponds to MPEG-2 motion_vertical_field_select[0][1] |

TABLE 6-continued

MPEG-4 header and its derivation (block and interlaced information)

| Header | Code | Comment |
| --- | --- | --- |
| Backward_bottom_field_reference | Same as MPEG-2 | Corresponds to MPEG-2 motion_vertical_field_select[1][1] |

TABLE 7

Mapping of frame_rate_code in MPEG-2 to vop_time_increment_resolution and fixed_vop_time_increment in MPEG-4.

| Frame_rate_code | Vop_time_increment_resolution | Fixed_vop_time_increment |
| --- | --- | --- |
| 0001 | 24,000 | 1001 |
| 0010 | 24 | 1 |
| 0011 | 25 | 1 |
| 0100 | 30,000 | 1001 |
| 0101 | 30 | 1 |
| 0110 | 50 | 1 |
| 0111 | 60,000 | 1001 |
| 1000 | 60 | 1 |

MV data is stored in the macroblock layer. Up to four MVs are possible for each macroblock. Moreover, a MV can be of either field or frame type and have either full pixel or half pixel resolution. The MPEG-2 MV decoding process is employed to determine motion_code (VLC) and motion_residual (FLC) and, hence, delta. Combined with predictive MV, delta gives the field/frame MV. The MV for skipped macroblocks is set to zero.

DCT data is stored in the block layer. It is first decoded from the bitstream (VLC), inverse scanned using either zigzag or alternate scanning pattern, and then inverse quantized. The intra DC coefficient is determined from dct_dc_differential and the predictor (the predictor is reset according to the MPEG-2 spec). DCT coefficients in a skipped macroblock are set to zero.

4.2 Texture Coding

A transcoder in accordance with the invention reuses DCT coefficients (for inter frame). The following guidelines should be used:

1. q_scale_type=1 (linear scale) is used in MPEG-2 quantization.

2. The MPEG quantization method should only be used (not H.263) in MPEG-4 quantization to reduce a mismatch between MPEG-2 and MPEG-4 reconstructed frame (drift).

3. A differential value of MPEG-2 QP determines dquant in MPEG-4. Dquant is set to ±2 whenever the differential value is greater than ±2. dquant is a 2-bit code which specifies a change in the quantizer, quant, for I- and P-VOPs.

4. The quantization matrix should be changed following the change of matrix in the MPEG-2 bitstream.

5. The transcoder has the flexibility of enabling an alternate vertical scanning method (for interlaced sequence) at the VOL level.

6. Intra AC/DC prediction (which involves scaling when the QP of the current block is not the same as that of the predicted block) should be turned off at a macroblock level to reduce complexity and mismatch in AC quantization.

7. Higher efficiency can be obtained with the use of intra_dc_vlc_thr to select the proper VLC table (AC/DC) for coding of intra DC coefficients, e.g., as a function of the quantization parameter (except when intra_dc_vlc_thr is either 0 or 7—these thresholds will force the use of the intra DC or AC table regardless of the QP).

8. A skipped macroblock is coded as not_coded macroblock (all DCT coefficients are zero).

9. Cbpy and cbpc (CBP) are set according to code_block_pattern_420 (CBP_420). Note that there is a slight discrepancy between CBP in MPEG-4 and CBP_420 in MPEG-2 for an intra macroblock. Specifically, when CBP_420 is set, it indicates that at least one of the DCT coefficients in that block is not zero. CBP contains similar information except it does not corresponds to a DC coefficient in an intra macroblock (also depending on intra_dc_vlc_thr). Hence, it is possible that CBP is not zero when CBP_420 is zero in an intra macroblock (this case can happen in an I-VOP and P-VOP, but not B-VOP).

There are three sources of loss in texture coding, namely QP coding, DC prediction and nonlinear scaler for DC quantization. MPEG-4 uses differential coding to code a QP. MPEG-2 allows all possible 32 QP values at the expense of 5 bits. However, the differential value can take up to ±2 (in QP value units) and, hence, a differential value greater than ±2 is loss. This loss can be minimized by limiting the QP fluctuation among the macroblock in the MPEG-2 rate control algorithm. All intra macroblocks perform adaptive DC prediction, which may take a different prediction from the previous macroblock (MPEG-2 DC prediction) thereby causing a different DC residual for the quantization. DC coefficients of all intra macroblocks in MPEG-4 are also quantised in a different manner from MPEG-2 because of the nonlinear scaler. Therefore, quantised DC coefficients for MPEG-2 and MPEG-4 coding are likely to be different for an intra macroblock.

4.3 MV Coding

The transcoder encodes MVs into an MPEG-4 format. However, there is no error involved in transcoding a MV from MPEG-2 to MPEG-4 since MV coding is a lossless process. The following constraints are imposed on a MPEG-4 encoder:

1. Unrestricted motion compensation mode is disabled, which means no MV pointing outside the boundary of the frame.

2. Advanced prediction mode is employed. A different predictor (a median value) is used in an MPEG-4 bitstream, but a MV for 8×8 pels block is not. That is, advanced prediction mode allows 8×8 MV and nonlinear (median filter) predictor. Only a nonlinear predictor is used in our format transcoder (we still keep a 16×16 MV).

3. Direct mode is not allowed in an MPEG-4 bitstream, which means there are only four MV types for a B-VOP, i.e., 16×16 forward and backward vectors and 16×8 forward and backward field vectors.

4. Field motion compensation is applied whenever a 16×8 field vector is used (maintain mode).

5. A skipped macroblock is coded as not_coded macroblock (motion compensation with zero MV).

6. Single f_code is allowed in MPEG-4. Therefore, the larger f_code in MPEG-2 between the two directions (vertical, horizontal) is converted to f_code in MPEG-4 based on the following relationship: f_code(MPEG-4) =f code(MPEG-2)−1.

7. A padding process is not used since the texture for the entire reference frame is known.

8. Field motion compensation is used whenever dual prime arithmetic is activated. Vector parities (field of the reference and field of the predicting frame) are preserved. Field MVs are generated according to vector[0][0][1:0] which is coded in the MPEG-2 bitstream. When prediction of the same parity is used (e.g., top field to top field, or bottom field to bottom field), both field MVs are vector[0][0][1:0]. When prediction of the odd parity is used (e.g., top field to bottom field, or bottom field to top field), the top field MV uses vector[2][0][1:0] and the bottom field MV uses vector[3][0][1:0]. Vector[r][0][0:1] for r=2,3 can computed as follows:

(a) Vector[r][0][0]=(vector[0][0][0]×m[parity_ref][parity_pred]//2)+dmvector[0].

(b) Vector[r][0][1]=(vector[0][0][1]×m[parity_ref][parity_pred]//2)+e[parity_ref][parity_pred]+dmvector[1].

Note that (m[parity_ref][parity_pred] and e[parity_ref][parity_pred] are defined in Table 7-11 and 7-12, respectively in the MPEG-2 specification (ISO/IEC 13818-2).

Moreover, "r" denotes the order of the MV, e.g., first, second, etc. r=0 denotes to the first set of MV, and r=1 denotes the second set of MV. Dual prime prediction uses r=2 and r=3 to identify two extra sets of MVs. "//" denotes integer division with rounding to the nearest integer.

4.4 Coding of Intra MB in B-VOP

Additional conversion is necessary when coding an intra MB in a B-frame of a MPEG-2 bitstream (e.g., as shown in FIG. 4). MPEG-4 replaces intra mode with direct mode for B-VOP and hence an intra MB in B-frame has to be coded differently in the MPEG-4 syntax. There are two practical solutions to this problem.

The first solution employs the architecture similar to the front-to-back transcoder of FIG. 3 (no buffer for the entire reference frame). MC is performed against the previous MB (or previous MB without compensating texture residual with the expense of the extra memory with the size of one MB) in the same VOP under the assumption that this MB is close enough to its reference MB (its uncompensated version).

The MV for the intra MB equals the MV of the previous MB offset by its MB distance. The second solution uses the architecture similar to the one shown in FIG. 4. It keeps the reference frame for all I and P-VOPs. Note that MC has to be performed on all P-VOPs in this solution. The MV for the intra MB is the same as the predicted MV (median of its three neighbors) and MC is performed against the reference MB pointed by the derived MV.

5. Video Downscaling in the Compressed Domain

Generally, video downscaling and size transcoding have the same meaning. Downsampling means sub-sampling with an anti-aliasing (low pass) filter, but subsampling and downsampling are used interchangeably herein.

Size transcoding becomes computationally intensive when its input and output are in the compressed domain. A video downscaling process which limits its operations in the compressed domain (and, in effect, avoids decoding and encoding processes) provides a much reduced complexity. However, two new problem arises with downscaling in the compressed domain, i.e., downsampling of DCT coefficients and MV data.

Recently, video downscaling algorithms in the compressed domain have been discussed, but they do not address the complete transcoding between MPEG-2 and MPEG-4, which includes field-to-frame deinterlacing. The present invention addresses this problem.

Subsection 5.1 and 5.2 provide solutions to two new problems in the downsampling process. The implementation of a proposed size transcoder in accordance with the invention is described in section 6 and FIGS. 5 and 6.

5.1 Subsampling of DCT Block

In frame-based video downscaling, it is necessary to merge four 8×8 DCT blocks into a new 8×8 DCT block (specific details involving a field block will be described later). Moreover, the output block should be a low pass version of the input blocks. This process is carried out in the spatial domain by multiplying the input matrix with a subsampling matrix (preferably with a low pass filter). Multiplication by a subsampling matrix in the spatial domain is equivalent to multiplication by DCT coefficients of a subsampling matrix in the DCT domain because of the distributive property of the orthogonal transform. However, the number of operations (computations) in the downsampling process in the DCT domain for some downsampling filters can be as high as the total number of operations of its counterpart in the spatial domain. The solution to this problem is to employ a downsampling matrix which is sparse (e.g., a matrix that has relatively few non-zero values, e.g., approximately 30% or less).

A sparse downsampling matrix may be based on the orthogonal property between the DCT basis vector and the symmetry structure of the DCT basis vector. One approach, discussed in R. Dugad and N. Ahuja, "A Fast Scheme For Downsampling And Upsampling In The DCT Domain," International Conference on Image Processing (ICIP) 99, incorporated herein by reference, takes the lower 4×4 DCT coefficients from four processing blocks, applies a 4×4 IDCT to each DCT subblock, forms a new 8×8 pixel block and applies an 8×8 DCT to obtain an output block. The downsampling matrix can be pre-calculated since the downsampling process is fixed. By splitting the 8×8 DCT matrix into left and right halves, about half of the downsampling matrix values are zero because of the orthogonality between the column of the 4×4 IDCT matrix and the row of both left and right 8×4 DCT matrices. This operation (one dimension) can be written mathematically as:

$$B = Tb = T \begin{bmatrix} b_1 \\ \ldots \\ b_2 \end{bmatrix} = [T_L \; \vdots \; T_R] \begin{bmatrix} T_4^t B_1 \\ \ldots \\ T_4^t B_2 \end{bmatrix} = T_L T_4^t B_1 + T_R T_4^t B_2$$

where b is a 8×1 spatial input vector, B is its corresponding 8×1 DCT vector, $b_1$ and $b_2$ are subsampled 4×1 vectors, $B_1$ and $B_2$ are lower 4×1 DCT vectors, T is the 8×8 DCT transform matrix, $T_4$ is the 4'4 DCT transform matrix, $T_L$ and $T_R$ are left and right half of T. The superscript "t" denotes a matrix transpose. Dugad's algorithm also employs the symmetry property of the DCT basis vector to reduce the complexity of the downsampling process. $T_L T_4^t$ and $T_R T_{4t}$ are identical in terms of magnitude ($T_L T_4^t(i,j)=(-1)^{i+j} T_R T_4^t (i,j), 0 \leq i \leq 7, 0 \leq j < 3$) since odd rows of T are anti-symmetric and even rows of T are symmetric. "i" is a matrix row index, and "j" is a matrix column index. Hence, both $T_L T_4^t$ and $T_R T_4^t$ can be calculated based on the same components, i.e., a symmetrical part, E, (index which i+j is even) and an anti-symmetrical part, O, (index which i+j is odd) ($T_L T_4^t = E+O$ and $T_R T_4^t = E-O$). This arrangement effectively reduces the number of multiplications by a factor of two when the downsampling process is done as:

$$B = T_L T_4^t B_1 + T_R T_4^t B_2 = (E+O)B_1 + (E-O)B_2 = E(B_1+B_2) + O(B_1-B_2)$$

Implementation of Dugad's method to convert four field blocks into one frame block is not as simple. An extension of the downsampling process in this scenario (one dimension) can be written as:

$$B = T(S_T T_4^t B_T + S_B T_4^t B_B)$$

where $B_T$ and $B_B$ are the lower 4×1 field vectors, $S_T$ and $S_B$ are DCT values of an 8×4 deinterlacing matrix corresponding to its top, $S_T$, and bottom, $S_B$, field block, respectively. Elements of $S_T$, $S_T(i,j)=1$ if (j=2i, $0 \leq i \leq 3$) and $S_T(i,j)=0$ otherwise. Elements of $S_B$, $S_B(i,j)=1$ if (j=2i+1, $0 \leq i \leq 3$) and $S_B(i,j)=0$ otherwise.

This is a modification of Dugad's algorithm for downsampling and deinterlacing in accordance with the present invention.

The operations of downscaling and the deinterlacing process are more complex since S and T are not orthogonal to each other and, hence, the downsampling matrix is not sparse. C. Yim and M. A. Isnardi, "An Efficient Method For DCT-Domain Image Resizing With Mixed Field/Frame-Mode Macroblocks," IEEE Trans. Circ. and Syst. For Video Technol., vol. 9. pp.696–700, August 1999, incorporated herein by reference, propose an efficient method for downsampling a field block. A low pass filter is integrated into the deinterlacing matrix in such a way that the downsampling matrix ($S = 0.5[I_8 \; I_8]$) is sparse.

$I_8$ denotes an 8×8 identity matrix, and $[I_8 \; I_8]$ denotes a 16×8 matrix that comprises a concatenation of the two identity matrixes. The identity matrix, of course, has all ones on the diagonal and all zeroes elsewhere.

The method starts with four 8×8 IDCT field blocks, then applies the downsampling matrix, S, and performs an 8×8 DCT to obtain the output block. Note that an 8×8 IDCT is used in this method instead of a 4×4 IDCT. This operation can be shown mathematically (in one dimension) as:

$$D = TS \begin{bmatrix} T^t & 0 \\ 0 & T^t \end{bmatrix} = \frac{1}{2} T[\, I_8 \; \vdots \; I_8 \,] \begin{bmatrix} T^t & 0 \\ 0 & T^t \end{bmatrix} = \frac{1}{2}[\, I_8 \; \vdots \; I_8 \,]$$

5.2 Subsampling of MV Data

ME is the bottleneck of the entire video encoding process. It is hence desirable to estimate a MV of the resized MB by using MVs of four original MBs without actually performing ME (assuming that all MBs are coded in inter mode). Note that, if an MPEG-2 bitstream is assumed, subsampling of MV data takes MVs of four MBs since each MB has one input (only an MPEG-4 bitstream can have a MV for every block). The simplest solution is to average four MVs together to obtain the new MV but it gives a poor estimate when those four MVs are different. B. Shen, I. K. Sethi and B. Vasudev, "Adaptive Motion-Vector Resampling For Compressed Video Downscaling," IEEE Trans. Circ. and Syst. For Video Technol., vol. 9, pp. 929–936, September 1999, show that a better result can be obtained by giving more weight to the worst predicted MV. A matching accuracy, A, of each MV is indicated by the number of nonzero AC coefficients in that MB. By using the Shen et al. technique, the new MV for the downscaled MB can be computed as:

$$MV' = \frac{1}{2} \frac{\sum_{i=1}^{4} MV_i A_i}{\sum_{i=1}^{4} A_i}$$

M. R. Hashemi, L. Winger and S. Panchanathan, "Compressed Domain Motion Vector Resampling For Downscaling Of MPEG Video," ICIP 99, propose a nonlinear method to estimate the MV of the resized MB. Similar to the algorithm in Shen et al., Hashemi's technique uses spatial activity of the processing MBs to estimate the new MV. A heuristic measurement, called Maximum Average Correlation (MAC) is employed in Hashemi's method to identify one of the four original MVs to be the output MV. By using the MAC, the new MV for the downscaled MB can be computed as:

$$MV = \max \sum_{i=1}^{4} A_i \rho^{d_i}$$

where $\rho$ is the spatial correlation and is set to 0.85, and $d_i$ is the Euclidean distance between the ith input MV ($MV_i$) and the output MV.

6. Implementation of the Size Transcoder

Figure 5B:
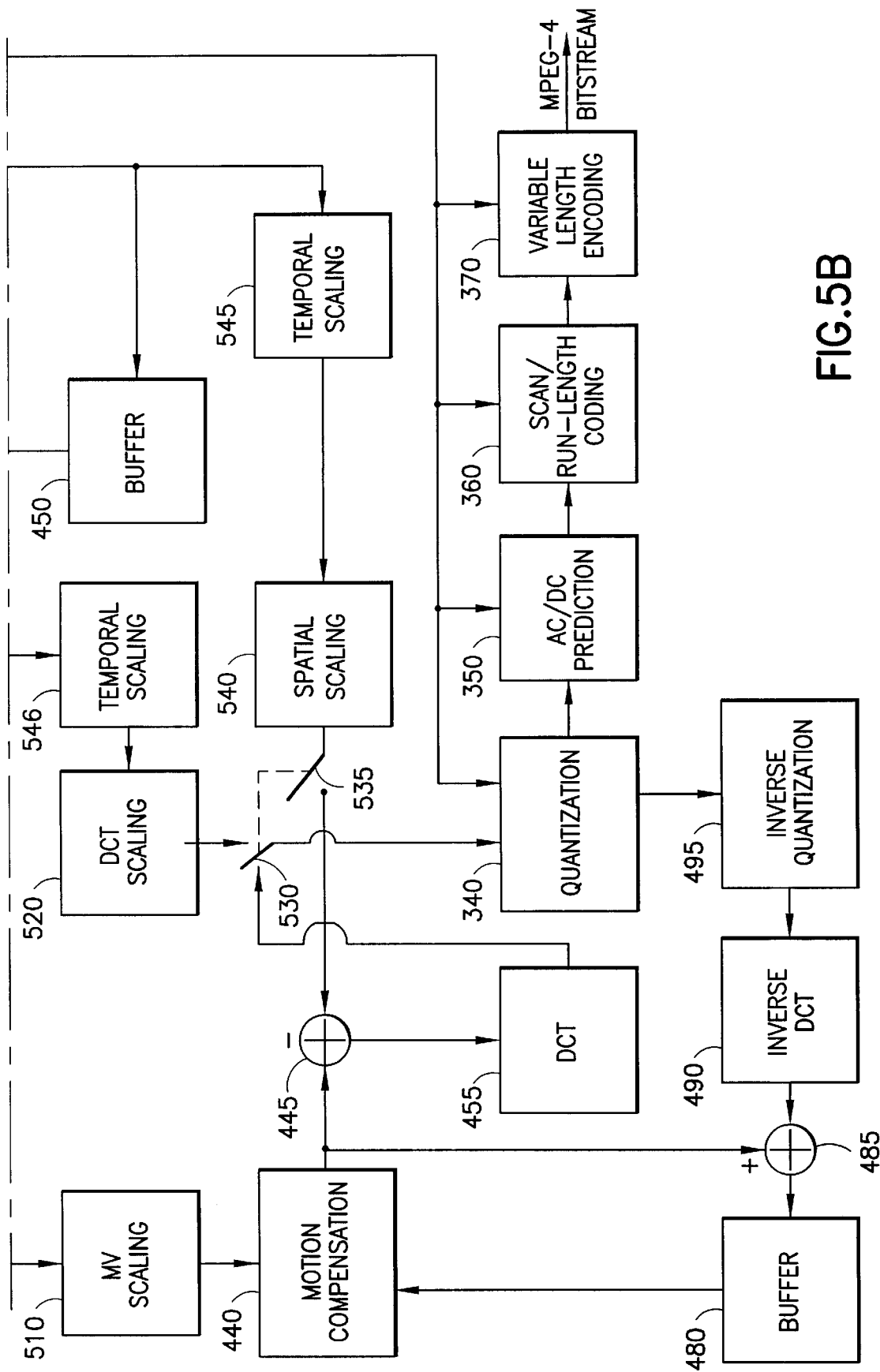
FIG. 5 illustrates a size transcoder in accordance with the invention.

FIG. 5 illustrates a size transcoder in accordance with the invention. B frames may be present in the input bitstream, but are discarded by the transcoder and therefore do not appear in the output bitstream.

In the transcoder 500, a MV scaling function 510, DCT scaling function 520, and spatial scaling function 540 are added. Switches 530 and 535 are coordinated so that, in a first setting, an output of the DCT function 455 is routed into the quantisation function 340, and the switch 535 is closed to enable an output of the spatial scaling function 540 to be input to the adder 445. In a second setting of the switches 530 and 535, an output of the DCT scaling function 520 is routed into the quantisation function 340, and the switch 535 is open.

The transcoder 500 converts an MPEG-2 bitstream into an MPEG-4 bitstream which corresponds to a smaller size video, e.g., from ITU-R 601 (720×480) to SIF (352×240).

To achieve a bandwidth requirement for the MPEG-4 bitstream, the transcoder 500 subsamples the video by two in both the horizontal and vertical directions (at the spatial scaling function 540) and skips all B-frames (at temporal scaling functions 545 and 546), thereby reducing the temporal resolution accordingly. Note that the temporal scaling function 546 could alternatively be provided after the DCT scaling function 520. Skipping of B-frames before performing downscaling reduces complexity.

Moreover, a low pass filter (which can be provided in the spatial scaling function 540) prior to subsampling should result in improves image quality.

The invention can be extended to include other downsampling factors, and B-VOPs, with minor modifications.

Specifically, changes in MV downscaling and mode decision are made. MV downscaling for B-VOP is a direct extension of what was discussed to include the backward MV. The mode decision for B-VOP can be handled in a similar way as in the P-VOP (e.g., by converting uni-directional MV into bi-directional MV as in converting intra MB into inter MB in a P-VOP).

Below, we discuss six problems that are addressed by the size transcoder 500. We also assume that the input video is 704×480 pixel resolution, and coded with an MP@ML MPEG-2 encoder, and the desired output is simple profile MPEG-4 bitstream which contains SIF progressive video (with a frame rate reduction by N). However, the invention can be extended to other input and output formats and resolutions as well.

6.1 Progressive Video MV Downscaling (Luma)

This problem appears when all four MBs are coded as inter, and use frame prediction. Each MV in those MBs is downscaled by two in each direction (horizontal and vertical) to determine the MV of four blocks in MPEG-4 (MPEG-4 allows one MV per 8×8 block). The scaled MVs are then predictively encoded (using a median filter) using the normal MPEG-4 procedure.

Note that each MB (comprising four blocks) has to be coded in the same mode in both MPEG-2 and MPEG-4. With video downscaling, the output MB (four blocks) corresponds to four input MBs.

6.2 Interlaced Video MV Downsampling (Luma)

This problem exists when all four MBs are coded as inter and use field prediction. We need to combine two field MVs in each MB to get a frame MV of the resized block. Instead of setting the new MV based on the spatial activity, the proposed transcoder picks the new MV based on its neighbors' MVs. The MVs of all eight surrounding MBs are used to find a predictor (field MVs are averaged in case of MB with field prediction). The median value from these eight MVs becomes a predictor, and the field MV of the current MB, which is closer in terms of Euclidean distance, is scaled by two in the horizontal direction to become the new MV.

6.3 MV Downsampling (Chroma)

This problem happens when all four MBs are coded as inter, and use either frame or field prediction (MPEG-4 treats both prediction mode in the same way for a chroma block). The process follows the MPEG-4 method to obtain a chroma MV from a luma MV, i.e., a chroma MV is the downscaled version of the average of its four corresponding, 8×8 luma MVs.

6.4 DCT Downsampling (Luma Progressive, Chroma)

This problem occurs when all four luma MBs are coded as intra or inter, and use frame MB structure, and their eight chroma blocks (four for Cr and four for Cb) use either frame or field structure). Dugad's method is used to downscale the luma and chroma DCT blocks by a factor of two in each direction.

6.5 Interlaced DCT Downsampling (Luma)

This problem arrives in one of two ways. First, its associated MB uses field prediction and second, its associated MB uses frame prediction. In either case, we want to downscale four 8×8 field DCT blocks (two for the top field, and two for the bottom field) into one 8×8 frame DCT block. The solution for the first case is to use the same field DCT block as the one chosen for MC. The second case involves deinterlacing and we propose a combination of the Dugad and Yim methods, discussed above.

Specifically, the transcoder first downscales four field blocks in the vertical direction (and at the same time performs deinterlacing) based on the Yim algorithm to obtain two frame blocks. The transcoder then downscales these two frame blocks in the horizontal direction to get the output block using the Dugad algorithm.

Figure 6:
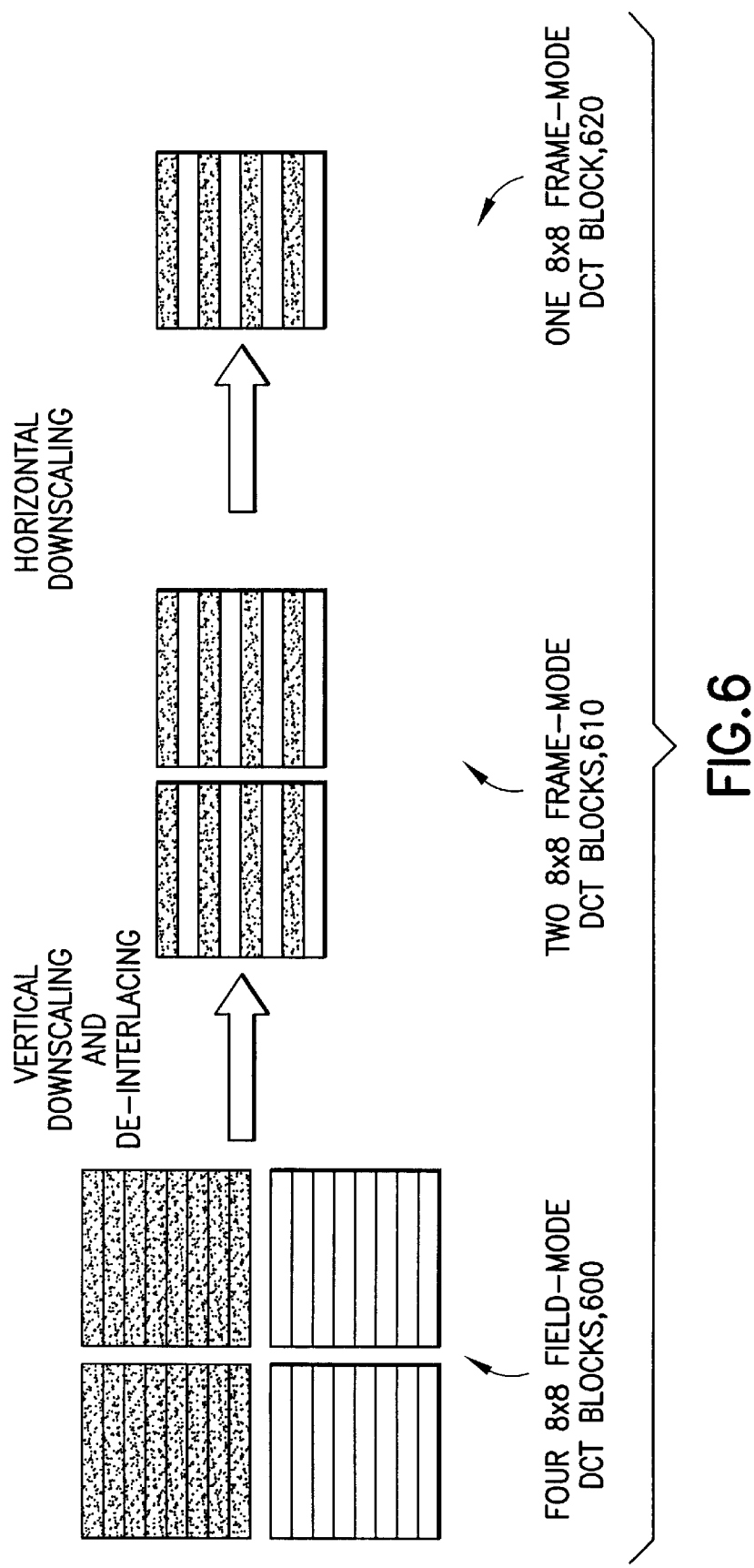
FIG. 6 illustrates downsampling of four field mode DCT blocks to one frame mode DCT block in accordance with the present invention.

This is illustrated in FIG. 6, where four 8×8 coefficient field-mode DCT blocks are shown at 600, two 8×8 frame-mode DCT blocks are shown at 610, and one 8×8 frame-mode DCT block is shown at 620.

The procedure for DCT downscaling in accordance with the invention can be summarized as follows:

1. Form the 16×16 coefficient input matrix by combining four field blocks together as shown at 600.

2. For vertical downscaling and filtering, apply a low pass (LP) filter D according to Yim's algorithm to every row of the input matrix. The LP input matrix is now 16×8 pixels, as shown at 610.

3. Form $B_1$ and $B_2$ 8×8 matrices from the LP matrix ($[B_1 \ldots B_2]$).

4. Perform a horizontal downscaling operation according to Dugad's algorithm to every column of $B_1$ and $B_2$ to obtain the output matrix (8×8) (620) as follows:

$$B = B_1(T_L T_4')^t + B_2(T_R T_4')^t = (B_1 + B_2)E + (B_1 - B_2)O$$

where E and O denote even and odd rows as discussed above.

In particular, a horizontal downsampling matrix composed of odd "O" and even "E" matrices as follows may be used (ignoring the scaling factor):

| | | | | |
|---|---|---|---|---|
| E = | [e (0) | 0 | 0 | 0, |
| | 0 | e (1) | 0 | e (2), |
| | 0 | 0 | 0 | 0, |
| | 0 | e (3) | 0 | e (4), |
| | 0 | 0 | e (5) | 0, |
| | 0 | e (6) | 0 | e (7), |
| | 0 | 0 | 0 | 0 |
| | 0 | e (8) | 0 | e (9)]. |
| O = | [0 | 0 | 0 | 0, |
| | o (0) | 0 | o (1) | 0, |
| | 0 | o (2) | 0 | 0, |
| | o (3) | 0 | o (4) | 0, |
| | 0 | 0 | 0 | 0, |
| | o (5) | 0 | o (6) | 0, |
| | 0 | 0 | 0 | o (7), |
| | o (8) | 0 | o (9) | 0]. |

The coefficients as follows can be used:

| | |
|---|---|
| e (0) = 4 | o (0) = 2.56915448 |
| e (1) = 0.831469612 | o (1) = −0.149315668 |
| e (2) = 0.045774654 | o (2) = 2 |
| e (3) = 1.582130167 | o (3) = −0.899976223 |
| e (4) = −0.195090322 | o (4) = 1.026559934 |
| e (5) = 2 | o (5) = 0.601344887 |
| e (6) = −0.704885901 | o (6) = 1.536355513 |
| e (7) = 0.980785280 | o (7) = 2 |
| e (8) = 0.906127446 | o (8) = −0.509795579 |
| e (9) = 1.731445835 | o (9) = −0.750660555. |

Essentially, the product of a DCT matrix which is sparse is used as the downsampling matrix.

The technique may be extended generally for 2:1 downsizing of an N×N block that comprises four N/2×N/2 coefficient field-mode blocks. Other downsizing ratios may also be accommodated.

6.6 Special Cases

Special cases occur when all four MBs are not coded in the same mode (not falling in any of the five previous cases).

We always assume that any intra or skipped MB among the other inter MBs are inter mode with zero MV. Field MVs are merged based on section 6.2 to obtain frame MV, and then we apply the techniques of section 6.1. MC is recommended to determine the texture of the intra block, which is treated as an inter block with a zero MV by the transcoder.

7. Conclusion

It should now be appreciated that the present invention provides a transcoder architecture that provides the lowest possible complexity with a small error. This error is generated in the MPEG-4 texture encoding process (QP coding, DC prediction, nonlinear DC scaler). These processes should be removed in the future profile of MPEG-4 to create a near-lossless transcoding system.

The invention also provides complete details of a size transcoder to convert a bitstream of ITU-R 601 interlaced video coding with MPEG-2 MP@ML into a simple profile MPEG-4 bitstream which contains SIF progressive video suitable for a streaming video application.

For spatial downscaling of field-mode DCT blocks, it is proposed to combine vertical and horizontal downscaling techniques in a novel manner such that sparse downsampling matrixes are used in both the vertical and horizontal direction, thereby reducing computations of the transcoder.

Moreover, for MV downscaling, we propose using a median value from its eight neighboring MV. This proposal works better than algorithms in section 5.2 since our predicted MV go with the global MV. It also works well with an interlaced MB, which has only two MVs instead of 4 MVs per MB.

Although the invention has been described in connection with various preferred embodiments, it should be appreciated that various modifications and adaptations may be made thereto without departing from the scope of the invention as set forth in the claims.

What is claimed is:

1. A method for transcoding a pre-compressed input bitstream that is provided in a first video coding format, comprising the steps of:

recovering header information of the input bitstream;

providing corresponding header information in a second, different video coding format;

partially decompressing the input bitstream to provide partially decompressed data; and re-compressing the partially decompressed data in accordance with the header information in the second format to provide an output bitstream wherein the first video coding format comprises MPEG-2 Main Profile at Main Level; and the second video coding format comprises an MPEG-4 bitstream with Standard Intermediate Format (SIF) progressive video.

2. The method of claim 1, wherein:

the first and second video coding formats comprise an MPEG-2 format and an MPEG-4 format, respectively.

3. The method of claim 1, wherein:

the partially decompressed data comprises motion vectors and Discrete Cosine Transform (DCT) coefficients; and the second format comprises at least one of a new mode decision, AC/DC prediction, and motion compensation.

4. The method of claim 1, wherein:

at least one look-up table is used to provide the corresponding header information in the second video coding format.

5. The method of claim 1, wherein:

downscaling is performed on the partially decompressed data by downsampling DCT coefficients and motion vector data thereof.

6. The method of claim 1, wherein:

2:1 downscaling is performed on at least one group of four field-mode Discrete Cosine Transform (DCT) blocks of the partially decompressed data by performing vertical downsampling and de-interlacing thereto to obtain a corresponding group of two frame-mode DCT blocks, and performing horizontal downsampling to the two frame-mode DCT blocks to obtain one frame-mode DCT block.

7. The method of claim 6, wherein:

the vertical downsampling also achieves low pass filtering of the four field-mode DCT blocks.

8. The method of claim 6, wherein:

the vertical and horizontal downsampling use respective sparse matrixes.

9. The method of claim 1, wherein:

in the recompressing step, a code (DQUANT) which specifies a change in a quantizer is set according to a differential value of a quantization parameter of the partially decompressed data.

10. The method of claim 1, wherein:

for re-compressing intra coded macroblocks, a coded block pattern (CBP) is set according to a corresponding value of the partially decompressed data.

11. The method of claim 1, wherein:

for re-compressing non-intra coded macroblocks, skipped macroblocks in the partially decompressed data are coded as not_coded macroblocks, where all Discrete Cosine Transform (DCT) coefficients have a zero value.

12. The method of claim 1, wherein:

in the recompressing step, predicted motion vectors in the partially decompressed data are reset according to the second format.

13. The method of claim 1, wherein:

in the recompressing step, dual prime mode macroblocks of the partially decompressed data are converted into field-coded macroblocks.

14. An apparatus for transcoding a pre-compressed input bitstream that is provided in a first video coding format, comprising:

means for recovering header information of the input bitstream;

means for providing corresponding header information in a second, different video coding format;

means for partially decompressing the input bitstream to provide partially decompressed data; and means for re-compressing the partially decompressed data in accordance with the header information in the second format to provide an output bitstream wherein the first video coding format comprises MPEG-2 Main Profile at Main Level; and the second video coding format comprises an MPEG-4 bitstream with Standard Intermediate Format (SIF) progressive video.

* * * * *